(12) United States Patent
Blair

(10) Patent No.: US 10,337,646 B2
(45) Date of Patent: Jul. 2, 2019

(54) LOCKOUT APPARATUSES AND SYSTEMS

(71) Applicant: David Oman Blair, Orem, UT (US)

(72) Inventor: David Oman Blair, Orem, UT (US)

( * ) Notice: Subject to any disclaimer, the term of this patent is extended or adjusted under 35 U.S.C. 154(b) by 44 days.

(21) Appl. No.: 15/623,374

(22) Filed: Jun. 14, 2017

(65) Prior Publication Data
US 2017/0363226 A1 Dec. 21, 2017

Related U.S. Application Data

(60) Provisional application No. 62/350,182, filed on Jun. 15, 2016.

(51) Int. Cl.
*F16K 35/06* (2006.01)

(52) U.S. Cl.
CPC .................................. *F16K 35/06* (2013.01)

(58) Field of Classification Search
CPC .......... F16K 35/00; F16K 35/10; F16K 35/06; E05B 67/383; E05B 73/0076; E05B 65/0089; F16B 41/005; B62D 53/085
USPC ........ 70/163–180, 32–34, 232; 411/910, 919
See application file for complete search history.

(56) References Cited

U.S. PATENT DOCUMENTS

| | | | | | |
|---|---|---|---|---|---|
| 1,832,057 A | * | 11/1931 | Stein | .................. | B60K 15/0409 70/164 |
| 1,855,931 A | * | 4/1932 | Washburn | ............. | B60R 13/105 292/327 |
| 1,878,436 A | * | 9/1932 | Burroughs | ......... | B60K 15/0409 220/210 |
| 1,916,518 A | * | 7/1933 | Lowther | ............ | B60K 15/0409 70/169 |
| 2,566,816 A | * | 9/1951 | Work | ..................... | B65D 39/12 220/210 |
| 3,477,607 A | * | 11/1969 | Johnson, Jr. | ........ | B60K 15/0409 220/210 |
| 3,950,971 A | * | 4/1976 | Karls | ..................... | B65D 55/14 70/164 |
| 4,254,801 A | * | 3/1981 | Gerthoffer | .......... | F16L 55/1157 138/89 |
| 6,044,670 A | * | 4/2000 | Citurs | .................. | A01C 23/008 215/360 |

* cited by examiner

*Primary Examiner* — Suzanne L Barrett

(57) ABSTRACT

Adjustable apparatuses for improved lockout-tag out safety. The apparatus includes anchor, drive and securing portions that allow the apparatus to sit within a valve casing and block access to a valve. The anchor portion is selectively expandable via the drive portion to grip opposing walls of the casing, thereby holding the lockout apparatus in place. The securing portion provides selective access, such as through a lockable latch, to the drive member. When the securing portion is in a closed state, the drive member is inaccessible and the anchor portion cannot be adjusted. Anchor portions can include scissor jacks or other types of pneumatic or hydraulic devices. The shape and size of the securing portion, such as a six-inch diameter disk or plate, can further allow the lockout apparatus to rest on a top portion of the casing when the anchor portion is in a contracted state.

20 Claims, 8 Drawing Sheets

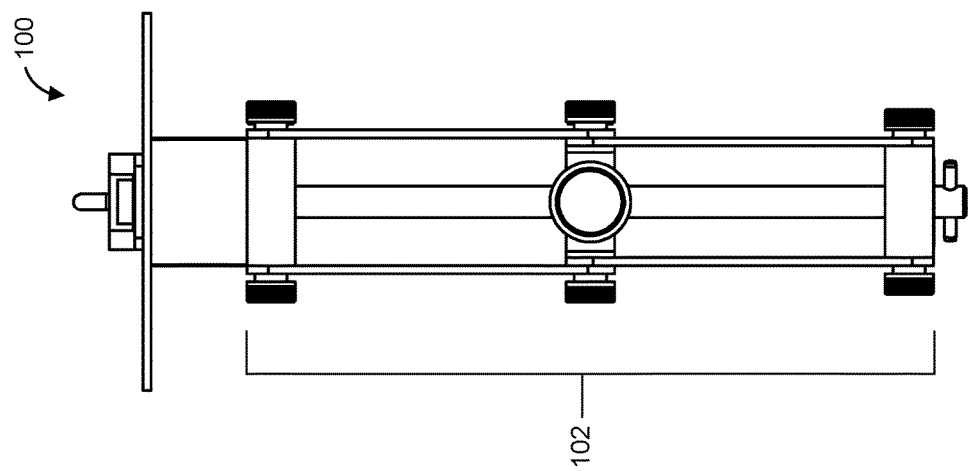
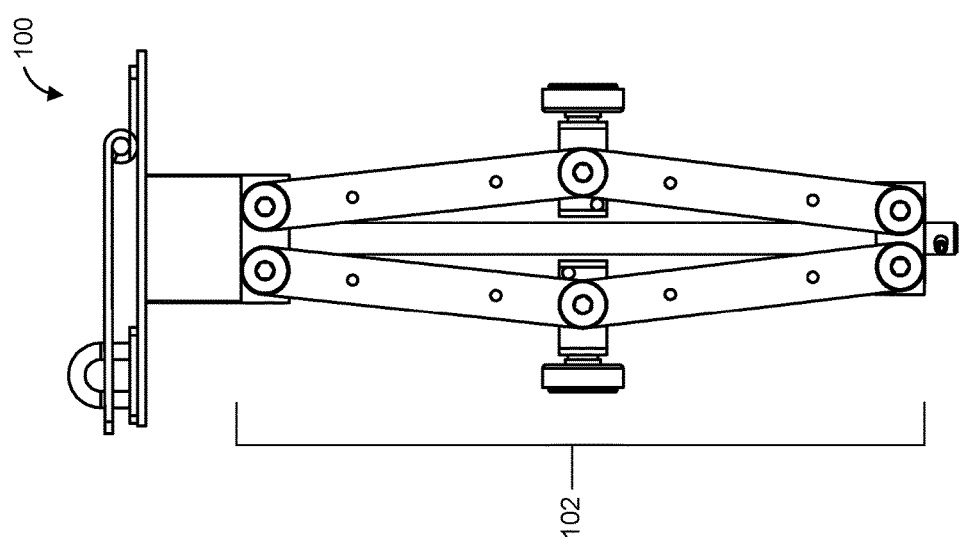
FIGURE 3B
FIGURE 3A

LOCKOUT APPARATUSES AND SYSTEMS

RELATED APPLICATION

The present application claims the benefit of priority under 35 U.S.C. § 119(e) from U.S. Provisional Application No. 62/350,182, filed Jun. 15, 2016, and titled "LOCKOUT APPARATUSES AND SYSTEMS," the entirety of which is hereby incorporated herein by reference to be considered part of this specification.

BACKGROUND

Field

The present disclosure relates to a safety apparatus and, in particular, to an adjustable lockout apparatus for use within a valve box.

Description of the Related Art

Workers servicing or maintaining piping systems, such as water pipes, can be seriously or fatally injured if fluids or gasses are prematurely released through the pipe during the service period. In practice, an operator generally closes a main valve, or multiple valves, to stop the flow of fluids or gasses when servicing pipes or equipment downstream from the valve. However, if another individual opens that valve prematurely prior to completion of the services, the operator can be flooded, burned, electrocuted or otherwise injured. There also exists the potential for the released fluids and/or gasses to damage equipment or property downstream.

As a safety measure, the operator can use tags, signs or similar items to put others on notice that a valve should not be accessed or adjusted. However, such notices can be easily removed or damaged, or even ignored by an individual.

Lockout devices, such as custom-sized wedges or covers, can be used to physically immobilize a valve. The usefulness of these devices, though, is limited as they can be difficult to adjust and/or adapt for different sizes and types of valves. For instance, a lockout device that is designed to immobilize a lever-type valve may not function with a valve having a hand wheel or other type of actuator. Moreover, conventional lockout devices can be awkward to put in place when the subject valve, like that associated with a water main, is located deep (such as between three and ten feet) within a valve box, casing, tube, well or like enclosed structure.

SUMMARY

In view of the foregoing, a need exists for improved lockout apparatuses and systems for valves or similar actuators that are located a distance into or deep within a valve box. Moreover, a need exists for adaptable lockout devices that can be easily adjusted to fit within various sizes of casings and to be compatible with different sizes and/or types of valves.

Certain embodiments of the invention allow an operator to lock out (or prevent) access for a wide variety of valves or actuators in different sizes of housings in commercial, residential or industrial settings so as to advantageously protect against tampering or accidental adjustments of valves. For instance, certain embodiments include an expandable and contractible lockout apparatus that substantially blocks access to a valve, such as for a water main, in a secure manner, without physically engaging the valve or without substantially altering the outside appearance of the access point of the valve box (e.g., allows the lid to the valve box to sit in its normal position). In one embodiment, the apparatus is selectively expandable to the diameter of the valve box, which is generally approximately six (6) inches in diameter.

In certain embodiments of the invention, a lockout apparatus is disclosed comprising an anchor member, a drive member and a securing member. The drive member is operably connected to the anchor member such that actuation of the drive member causes expansion of the anchor member in a plane or direction substantially transverse to an axis running through the apparatus and substantially parallel with an axis of the valve box. The securing member is configured to provide selective access to the drive member.

In certain embodiments, the anchor member comprises a scissor jack or like device that is selectively expanded and contracted via a drive member comprising a threaded shaft. For instance, in certain embodiments, rotation of the drive member can cause the anchor member to expand or contract within the valve box.

The securing member can comprise a lockable latch or other cover that prevents access to or operation of the drive member. For instance, in such embodiments, the securing member can comprise a recessed cavity in which at least a portion of the drive member sits and is selectively covered by the latch or cover, thus allowing the user to employ a secure lockout-tag out procedure.

The anchor member can further comprise at least two bumpers, such as rubber stops, opposite each other on outside portions of the anchor member and configured to contact or grip the inside surface of the valve box when the anchor member is in an expanded state. These bumpers enable the lockout apparatus to remain firmly in place within the valve box between the access point of the valve box and the valve.

In certain embodiments, a lockout apparatus for a valve box is disclosed having an anchor member, a drive member and a securing member. The anchor member includes first and second bumpers secured to opposite sides of the anchor member. The drive member comprises an elongated shaft coupled to a head and operably connected to the anchor member. The elongated shaft is configured to: (a) when the head is rotated in a first direction, cause a distance between the first and second bumpers to increase, and (b) when the head is rotated in a second direction, cause the distance between the first and second bumpers to decrease. The securing member includes a plate having a recessed portion or area (such as toward the center of the plate), the recessed portion further comprising an aperture. The head of the drive member is positioned within the recessed portion, and the elongated shaft extends through the aperture. The securing member further comprises a latch on a top side of the plate and configured to provide selective access to the head of the drive member such that when the latch is in an open position, the head of the drive member is uncovered, and when the latch is in a closed position, the head of the drive member is covered and cannot be rotated in either of the first or second directions, thereby preventing the distance between the first and second bumpers from substantially changing. In certain further embodiments, the anchor member comprises a scissor jack device or assembly.

In yet other embodiments, a lockout device for a valve box is disclosed. The device features an anchor adjustable between an expanded state and a contracted state, wherein in the expanded state the anchor has a first width, and wherein in the contracted state the anchor has a second width, wherein the first width is shorter than the second width. The device also comprises a drive member that is operably connected to the anchor and configured to: (a) when actuated in a first manner, adjust the anchor from the expanded state toward the contracted state, and (b) when actuated in a second manner, adjust the anchor from the contracted state toward the expanded state. The device also includes a securing member or cover comprising a plate having a diameter of at least six inches, wherein the drive member extends through the plate. The securing member is further configured to provide selective access to the drive member such that when the securing member is in an open position, the drive member is uncovered and accessible to be actuated in the first or second manners, and when the securing member is in a closed position, the securing member covers the drive member such that the drive member cannot be actuated in either the first manner or the second manner.

In yet other embodiments, a lockout assembly for a valve box is disclosed that has an adjustable anchor member, a drive member and a circular securing member. The adjustable anchor member has a perimeter around a center portion of the anchor member. The drive member is operably connected to the anchor member and configured to: (a) when rotated in a first direction, enlarge the perimeter of the adjustable anchor member, and (b) when rotated in a second direction, reduce the perimeter of the adjustable anchor member, wherein the first direction is opposite the second direction. The circular securing member has a diameter of at least six inches and is connected to the adjustable anchor member and configured to selectively prevent rotation of the drive member.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 3A and 3B illustrate side views of the lockout apparatus of FIG. 1 in a contracted state.

DETAILED DESCRIPTION OF THE EMBODIMENTS

Figure 1:
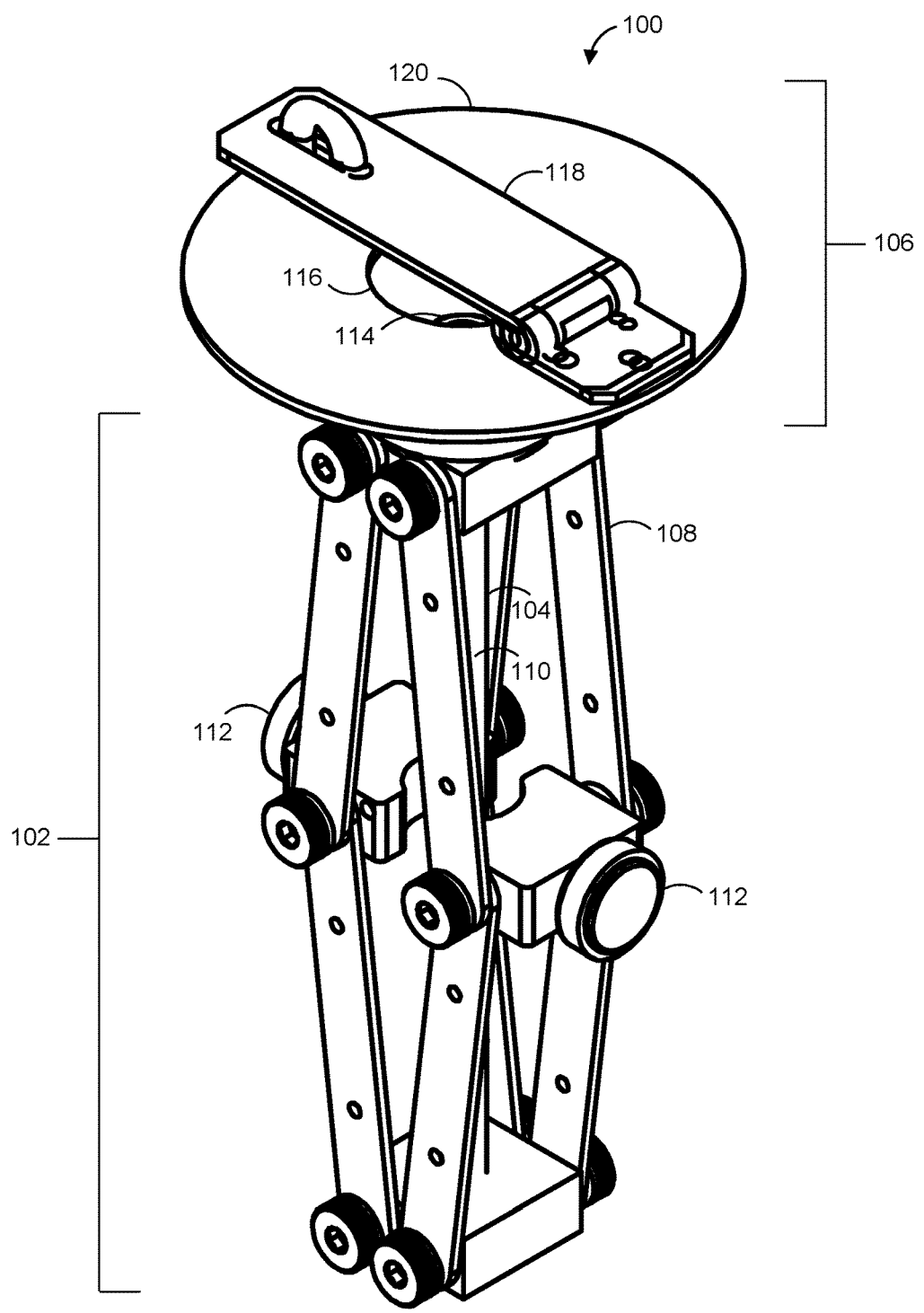
FIG. 1 illustrates a perspective view of a lockout apparatus according to certain embodiments of the invention.

As will be seen from the disclosure herein, lockout apparatuses, assemblies and systems are provided for improved lockout-tag out processes for valves or similar actuators that are located a distance into and/or deep within a valve box. The lockout apparatuses are designed such that the apparatus can fit within various sizes of casings, be adjusted to grip opposing walls of the casing, and secured to prohibit further adjustments to the apparatus, thereby forming a safety barrier to the valve and allowing an operator to safely work downstream from the valve. The versatility of the apparatus allows it to be used in a variety of conditions and environments and without significant effort or preparation by the operator.

For instance, certain embodiments of the invention allow an operator to lock out access, in order to prevent tampering or accidental adjustments of valves, for a wide variety of valves or actuators in different sizes of housings in commercial, residential or industrial settings. In particular, certain embodiments include an expandable and contractible lockout apparatus that substantially blocks access to a valve, such as for a water main, in a secure manner, without physically engaging the valve and/or without substantially altering the outside appearance of the access point of the valve box (e.g., allows the lid to the access point to sit in its normal position). In one embodiment, the apparatus is selectively expandable to the diameter of the valve box, which is generally approximately six (6) inches in diameter.

In certain embodiments of the invention, the lockout apparatus includes an anchor member, a drive member and a securing member. The drive member is operably connected to the anchor member such that actuation of the drive member causes expansion of the anchor member in a plane or direction substantially transverse to an axis running through the apparatus and substantially parallel with an axis of the valve box. The securing member is configured to provide selective access to the drive member.

In certain embodiments, the anchor member comprises a scissor jack or like device or assembly that can be selectively expanded and contracted via a threaded shaft of the drive member. For instance, rotation of the threaded shaft can cause expansion or contraction of the anchor member. The securing member can comprise a lockable latch or other cover that prevents access or operation of the drive member. For instance, in such embodiments, the securing member can comprise a recessed cavity in which at least a portion of the drive member sits and is selectively covered by the latch or cover, thus allowing the user to employ a lockout-tag out procedure.

The anchor member can further comprise at least two bumpers, such as rubber stops, opposite each other on outside portions of the anchor member and configured to contact or grip the inside surfaces of a valve box when the anchor member is in an expanded state. This allows the apparatus to be firmly positioned in the valve box between the access point of the valve box and the valve.

In certain embodiments, a lockout apparatus for a valve box is disclosed having an anchor member, a drive member and a securing member. The anchor member includes first and second bumpers secured to opposite sides of the anchor member. The drive member comprises an elongated shaft coupled to a head and operably connected to the anchor member. The elongated shaft is configured to: (a) when the head is rotated in a first direction, cause a distance between the first and second bumpers to increase, and (b) when the head is rotated in a second direction, cause the distance between the first and second bumpers to decrease. The securing member includes a plate having a recessed portion or area (such as toward the center of the plate), the recessed portion further comprising an aperture. The head of the drive member is positioned within the recessed portion, and the elongated shaft extends through the aperture. The securing member further comprises a latch on a top side of the plate and configured to provide selective access to the head of the drive member such that when the latch is in an open position, the head of the drive member is uncovered, and when the latch is in a closed position, the head of the drive member is covered and cannot be rotated in either of the first or second directions, thereby preventing the distance between the first and second bumpers from substantially changing. In certain further embodiments, the anchor member comprises a scissor jack device or assembly.

In yet other embodiments, a lockout device for a valve box is disclosed. The device features an anchor adjustable between an expanded state and a contracted state, wherein in the expanded state the anchor has a first width, and wherein in the contracted state the anchor has a second width, wherein the first width is shorter than the second width. The device also comprises a drive member that is operably connected to the anchor and configured to: (a) when actuated in a first manner, adjust the anchor from the expanded state toward the contracted state, and (b) when actuated in a second manner, adjust the anchor from the contracted state toward the expanded state. The device also includes a securing member or cover comprising a plate having a diameter of at least six inches, wherein the drive member extends through the plate. The securing member is further configured to provide selective access to the drive member such that when the securing member is in an open position, the drive member is uncovered and accessible to be actuated in the first or second manners, and when the securing member is in a closed position, the securing member covers the drive member such that the drive member cannot be actuated in either the first manner or the second manner.

In yet other embodiments, a lockout assembly for a valve box is disclosed that has an adjustable anchor member, a drive member and a circular securing member. The adjustable anchor member has a perimeter around a center portion of the anchor member. The drive member is operably connected to the anchor member and configured to: (a) when rotated in a first direction, enlarge the perimeter of the adjustable anchor member, and (b) when rotated in a second direction, reduce the perimeter of the adjustable anchor member, wherein the first direction is opposite the second direction. The circular securing member has a diameter of at least six inches and is connected to the adjustable anchor member and configured to selectively prevent rotation of the drive member.

The features of the devices and methods will now be described with reference to the drawings summarized above for a thorough understanding of, and enabling description for, the embodiments of the inventions. Throughout the drawings, reference numbers are re-used to indicate correspondence between referenced elements. The drawings, associated descriptions, and specific implementation are provided to illustrate embodiments of the invention and not to limit the scope of the disclosure. One skilled in the art will understand that embodiments of the invention may be practiced without all the described details. In other instances, well-known structures and functions have not been shown or described in detail to avoid unnecessarily obscuring the description of the embodiments of the invention.

The terminology used in the description is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this disclosure.

Moreover, the disclosure and/or drawings may include or suggest dimension, size, angle, scale or like information specific to certain embodiments of the invention. Such information is included as examples and is not intended as limiting to embodiments of the invention. Rather, those with skill in the relevant art will understand from the disclosure herein that other embodiments of the invention can include different size(s), angle(s), scale(s), combinations of the same or the like.

Turning to the figures, FIG. 1 illustrates a perspective view of a lockout apparatus or assembly 100 in a substantially contracted state according to certain embodiments of the invention. As shown, the apparatus 100 includes an anchor member 102, a drive member 104 and a securing member 106. In general, the securing member 106, which is depicted as including a cover plate, is configured to substantially cover the access point of a valve box while selectively allowing access to the drive member 104, the operation or engagement of which causes the anchor member 102 to expand or contract as needed.

In use, an operator places the lockout apparatus 100 on top of, or into, a valve box such that the anchor member 102, in a contracted state, is positioned within the valve box (e.g., between the access point of the valve box and the valve) and the securing member 106 sits on the top portion or lip of the box. The operator then adjusts, operates or engages the drive member 104 to expand the anchor member 102 until the anchor member 102 comes into contact with at least two opposite sides of the valve box, the pressure from the anchor member 102 against those sides (e.g., by gripping the sides and/or creating friction) being substantial enough to prevent an individual from easily removing the apparatus 100 from the valve box and/or to secure the apparatus 100 from sliding further down the valve box.

Once the anchor member 102, or means for anchoring the apparatus 100 to the valve box, is fixed within the valve box, the operator secures the securing member 106 to prevent access to the drive member 104. In this secure or locked state, the anchor member 102 cannot be further adjusted, thereby creating a secure temporary barrier (e.g., substantially perpendicular or transverse to a given axis of the apparatus 100) to a valve located beneath the apparatus 100.

As shown in FIG. 1, in certain embodiments, the anchor member 102 comprises a scissor jack or scissor-jack device 108 that is configured to expand, or contract, in a horizontal plane, or a plane perpendicular to the axis of the apparatus 100 that extends into the valve box, to selectively push against the inside walls of a valve box. The drive member 104, or means for adjusting the anchor member, comprises an elongated threaded shaft/body 110 that extends through threaded, opposite ends or hubs of the scissor jack 108 positioned along the axis of the apparatus 100.

In particular, the illustrated scissor jack 108 comprises a hinged, diamond-shaped frame that expands in the horizontal plane (while, at the same time, contracting in a vertical plane perpendicular to the horizontal plane) in response to rotation of the threaded shaft 110 in a first direction. That is, rotation of the threaded shaft 110 in the first direction, such as with a clockwise rotation, causes the opposite ends or hubs of the scissor jack 108 to approach each other along the axis of the apparatus 100. Rotating the threaded shaft 110 in a second (opposite) direction, on the other hand, causes the hinged, diamond-shaped frame of the scissor jack 108 to contract in the horizontal plane. The illustrated anchor member 102, which is shown in a substantially contracted position, further comprises two (2) bumpers 112, such as pads, rubber bumpers or stops or the like, that are configured to grip the valve box wall(s) or casing while the anchor member 102 is in its expanded state.

The illustrated drive member 104 further comprises a head 114 operably connected to the threaded shaft 110 so that rotation of the head 114 causes the shaft 110 of the drive member 104 extending through the anchor member 102 to rotate, thereby causing the anchor member 102 to expand, and thereby causing extension of the bumpers 112, in an outward, horizontal (radial) direction. In certain embodiments, the head 114 and shaft 110 consist of a single component, such as an elongated bolt. In certain embodiments, the head 114 has a hexagonal or other shape that can be easily rotated using a socket wrench or other suitable ratchet tool.

In yet other embodiments, the drive member 104 can comprise a component separate from, but operably connected to, a threaded component of the anchor member 102 such that rotation of the drive member 104 causes rotation of the threaded component of the anchor member 102, thereby causing expansion or contraction of the anchor member 102. It will be apparent to those with skill in the art, in view of the disclosure herein, that a number of variations or configurations exist for the drive member 104 to engage the anchor member 102.

As further illustrated in FIG. 1, the head 114 of the drive member 104 sits within a recessed cavity or portion 116 of the securing member 106 such that the threaded shaft 110 of the drive member 104 extends through an aperture or hole at the bottom of the recessed portion 116 of the securing member 106. Ideally, the diameter of the head 114 is greater than the diameter of the aperture such that the entire drive member 104 will not slip through the aperture when in an upright position. In yet other embodiments, washers and/or nuts can be secured to the threaded shaft 110 on a top and/or bottom side of the securing member 106 to further fasten the drive member 104 to the securing member 106.

The securing member 106, or means for selectively prohibiting access to the drive member 104, further comprises a hinged latch 118 that, when in a closed position, covers at least a portion of the recessed portion 116, thereby preventing operable access to the head 114 of the drive member 104. For instance, the illustrated latch 118 can be located on the top side of a cover plate and locked in place with a padlock or other like device. On the other hand, when the latch 118 is in an open position, an individual can access the drive member 104 to expand or contract the anchor member 102.

In certain embodiments, the securing member 106, including the latch 118, is formed of metal or like material to provide stability and security for the lockout apparatus 100. In certain other embodiments, the securing member 106 can be formed of a single, unitary material. In yet other embodiments, the latch 118 and/or other components of the securing member 106 (such as, for example, the metal loop shown in FIG. 1) can be formed of a material that can be cut with bolt cutters or like tools to enable emergency access to the drive member 104.

A top (circular) plate 120, or cover plate, of the securing member 106, in certain embodiments, has a diameter of at least six inches, such as for example six and one quarter-inch, so that the underside of the plate 120 is configured to rest upon a top lip of a valve box while, at the same time, fitting underneath the lid of the valve box. This shape and size of the plate 120 advantageously allows an operator to rest the lockout apparatus 100 on the lip of the valve box while engaging the drive member 104 and expanding the anchor member 102. This circular shape of the plate 120 also blocks access down the valve box. The cover plate 120 can also be secured to a portion of the anchor member 102 such that the anchor member 102 does not rotate with respect to the plate 120.

In certain embodiments, when in a contracted state, the anchor member 102 has a width, as measured at the widest point in the horizontal plane, of no more than three (3) inches so that the anchor member 102 can fit within a three-inch valve box. As one example, the scissor-jack anchor member 102 can have a length of approximately ten (10) inches and a width of approximately three (3) inches when in a contracted state. In yet other embodiments, the length of the anchor member 102 can range from seven (7) inches to twelve (12) inches depending on how far the anchor member 102 is designed to expand.

In certain embodiments, the threaded shaft 110 has a diameter of approximately one-half inch and extends through the aperture of the recessed portion 116 having a three-quarter inch diameter. Moreover, the recessed portion 116 of the securing member 106 can be approximately one and one-half inches deep and have a diameter of approximately two (2) inches. In yet other embodiments, the depth and/or diameter of the recessed portion 116 can vary depending upon intended uses and operational factors.

Although the lockout apparatus 100 has been described with reference to particular embodiments, a skilled artisan will recognize from the disclosure herein that a number of alternative configurations can be used with the apparatus 100. For example, in certain embodiments, the bumpers 112 can comprise neoprene, plastic or another like non-slip substance. In yet other embodiments, one or more of the bumpers 112 can be selectively removable or interchangeable so that they can be replaced and/or adapted for, for example, different valve box materials or environments. In further embodiments, the anchor member 102 may comprise more than two bumpers.

In yet other embodiments, other types of anchor devices or assemblies can be used with the lockout apparatus 100. For instance, the anchor member could include a pneumatic device, hydraulic device, pistons, springs, a balloon or other means for selectively contracting and expanding through the engagement of a drive member. As one example, in the case of a balloon-type anchor member, the drive member could include a selectively closeable tubular member, such as a Presta or Schrader valve, for inflating and deflating the balloon-type anchor member. In yet other embodiments, the anchor member 102 can be configured to contact with a valve box wall at a plurality of points (or even continuously) along a side of the wall to increase friction and secure the lockout apparatus in place.

In another embodiment of the invention, sliding or moving an element along the drive member 104 can cause the anchor member 102 to expand or contract, similar to an umbrella-like configuration. For instance, the anchor member could comprise a plurality of stretchers or spokes operably connected to a runner component along the length of the drive member. Sliding the runner in a first direction along the length of the drive member can cause the stretchers or spokes to expand a plurality of ribs to contact the walls of the valve box (while sliding the runner in the opposite direction would have an opposite effect). In yet other embodiments, the anchor member 102 can comprise a mesh tube-like configuration that can be selectively expanded or contracted. A skilled artisan will recognize from this disclosure a number of configurations for a means for anchoring that can be used to accomplish the lockout purposes and/or uses described herein.

In yet other embodiments, the anchor member 102 and/or the drive member 104 can further comprise one or more stops, cotter pins and/or the like along the threaded shaft 110 that selectively prevent(s) contraction or expansion of the anchor member 102 beyond certain points. For instance, fixed nuts could be placed along the threaded shaft 110 to prevent rotation of the threaded shaft 110 beyond defined points, thereby limiting the range of expansion and/or contraction of the anchor member 102 to, for example, protect the walls of a valve box from too much pressure from the anchor device 102.

Although the operation of the lockout apparatus 100 has been described for use in a valve box, a skilled artisan will recognize from the disclosure herein that the lockout apparatus can be used with a wide variety of access points for one or more shut off valves, including, but not limited to, a housing, casing, tube, box, corridor, internal conduit, curb box or the like.

Figure 2:
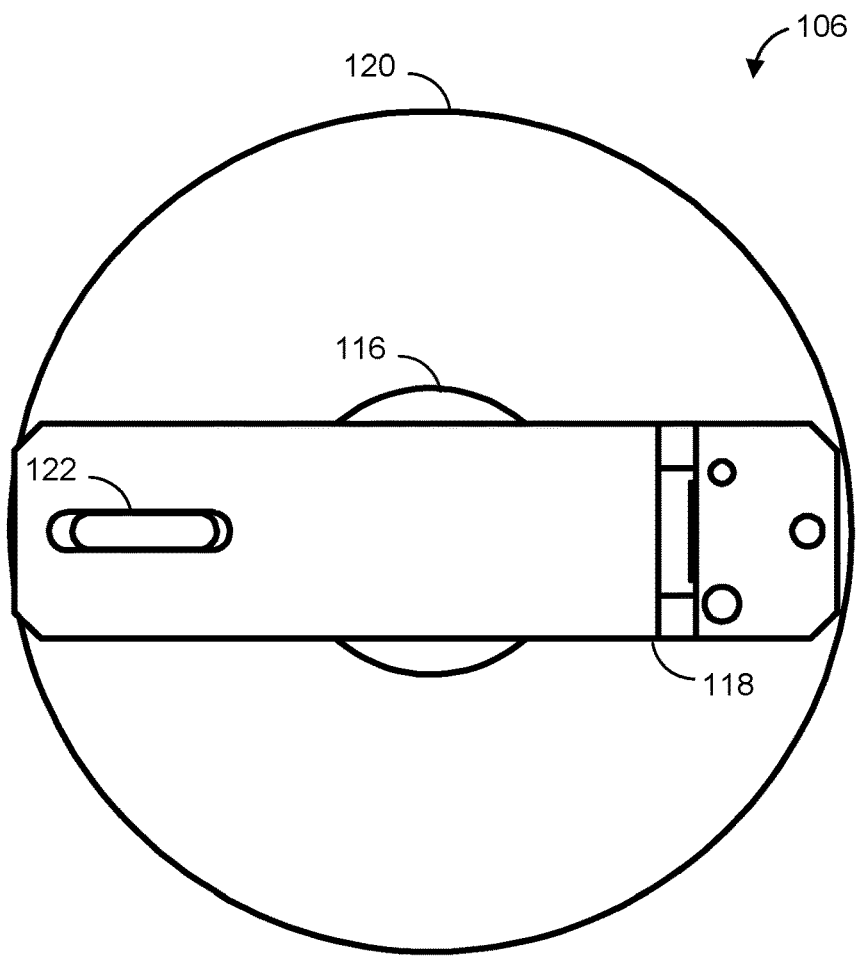
FIG. 2 illustrates a top plan view of the lockout apparatus of FIG. 1.

FIG. 2 illustrates a top view of the securing member 106 of the lockout apparatus 100 of FIG. 1 while in a closed position. In general, this figure represents the view of the lockout apparatus 100 if an individual were to look down from directly above the apparatus 100 while it is situated within a valve box. In particular, the hinged latch 118, while in a closed position, substantially covers the recessed portion 116 to prevent access to a drive member located underneath, thereby prohibiting one from adjusting the anchor member and prematurely removing the lockout apparatus 100 from the valve box. As shown, the latch 118 further includes a slot that, when the latch 118 is in a closed position, fits over a loop 122, such as a metal loop, secured to the top side of the securing member 106 (such as the cover plate 120) and enables an operator to lock the latch 118, such as with a padlock, in place when in use.

In yet other embodiments, the securing member 106 could include other means for locking the latch 118 and/or prohibiting operation of, and/or access to, the drive member 104. For instance, the securing member 106 could comprise an integrated, lockable cover (e.g., one that is rotatable or slidable), lock box assembly or the like.

Although FIG. 2 depicts the recessed portion 116 having a circular shape, in other embodiments, the recessed portion may comprise a square or other shaped cavity that includes an aperture or hole for receiving the drive member. Such an aperture may have a diameter, for example, of approximately three quarters of an inch. In other embodiments, the recessed portion 116 may further comprise one or more drain holes such that water that collects within the recessed portion 116 can drain out instead of pooling. In yet other embodiments, the securing member 106 may further comprise one or more handles or similar grips on the top side thereof for facilitating transportation or movement of the lockout apparatus 100.

FIGS. 3A and 3B illustrate side views of the lockout apparatus 100 in a contracted (non-expanded) state. It is in this state that the lockout apparatus 100 would generally be placed within a valve box prior to engaging the anchor member 102.

In certain embodiments, elements of the lockout apparatus 100 are comprised of a material that is able to withstand water or other elements that may be present within a valve box. For instance, elements of the lockout apparatus 100 could consist of metal, hard plastic, alloys, combinations of the same or the like. In yet other embodiments, the lockout apparatus 100 can be configured to receive interchangeable drive and/or securing members.

Figure 4:
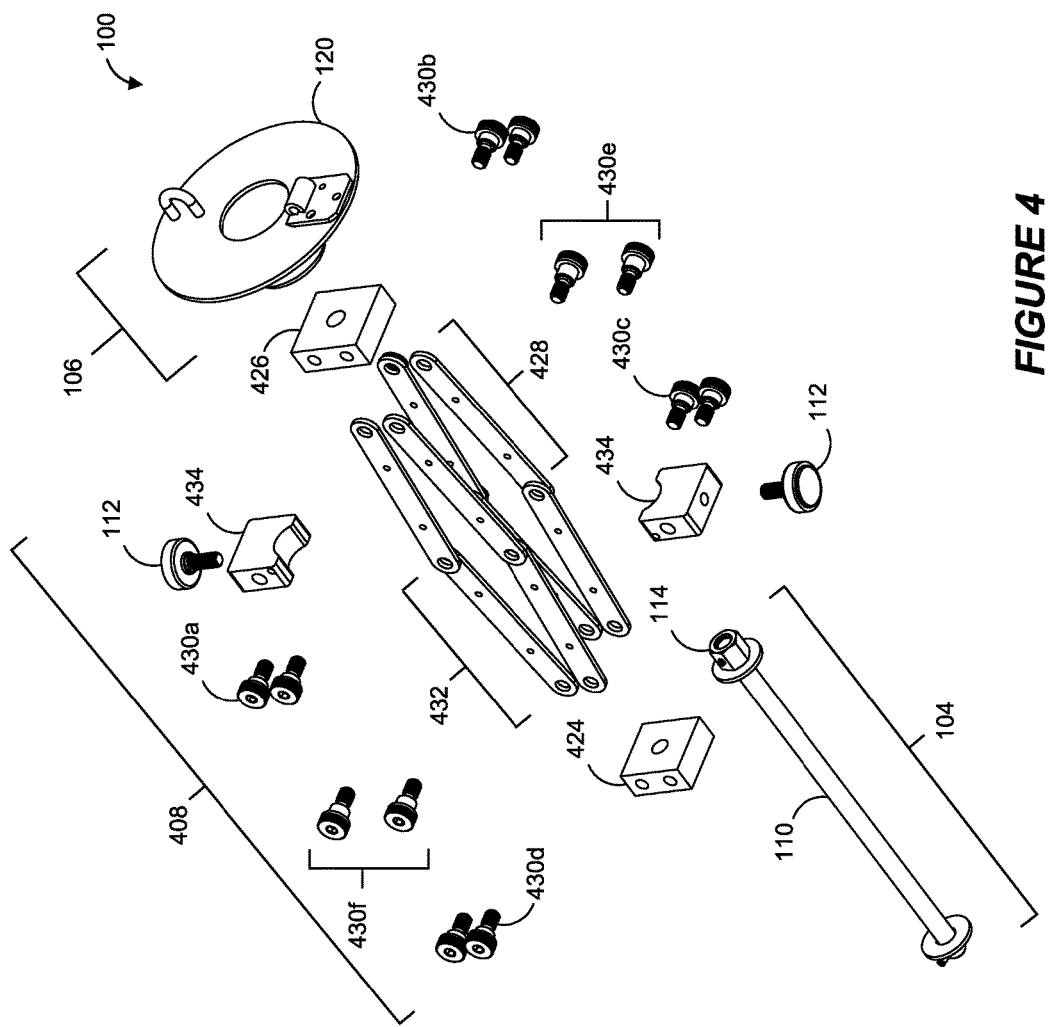
FIG. 4 illustrates a perspective, exploded view of a lockout apparatus similar to that depicted in FIG. 1.

FIG. 4 illustrates an exploded view of the apparatus 100 of FIGS. 1 through 3B. To simplify the present description, functions and specifications of components in the remaining figures will not be redescribed in detail if they are previously described herein.

As shown, the lockout apparatus 100 includes the drive member 104 having the threaded shaft 110 whose ends are configured to extend through threaded holes within end blocks or hubs 424, 426 and through the plate 120. The head 114 on the top end of the drive member 104 is configured to sit within the plate 120 of the securing member 106 on a side of the plate 120 opposite the side of the end block 426. In operation, rotation of the head 114 of the drive member 104 causes one or both of the end blocks or hubs 424, 426 to approach or separate from each other along the shaft 110 depending on the direction the head 114 is rotated.

End block (or upper hub) 426 is configured to be operably secured to top arms or trusses 428 of the scissor jack device 108 via bolts 430a, 430b (or other similar screws or attachments). End block (or lower hub) 424 is configured to be operably secured to bottom arms or trusses 432 of the scissor jack device 108 via bolts 430c, 430d. This configuration allows the arms 428, 432 to pivot freely with respect to the respective end blocks 426, 424 when the apparatus 100 is in operation.

Bumpers 112 are secured to mounting blocks or spurs 434, such as via a screw or through glue, epoxy, heat treatments, fasteners and/or other methods of securing the components. The mounting blocks 434 are configured to be secured via bolts 430e, 430f to a middle portion of the scissor jack device 108, ideally where the top and bottom arms 428, 432 connect at a pivot portion of the device 108.

The end block 426 is configured to be secured or fixed to the plate 120 of the securing member 106, which further includes a latch or lock box assembly (not completely depicted in the figure). Ideally, in certain embodiments, rotation of the drive member 104 does not cause rotation of the end block 426.

A skilled artisan will recognize from the disclosure herein a wide variety of other uses for the described lockout devices. For instance, in addition to water mains, the lockout apparatus could be used with gas, steam, chemical and multiple other product delivery valves.

Figure 5:
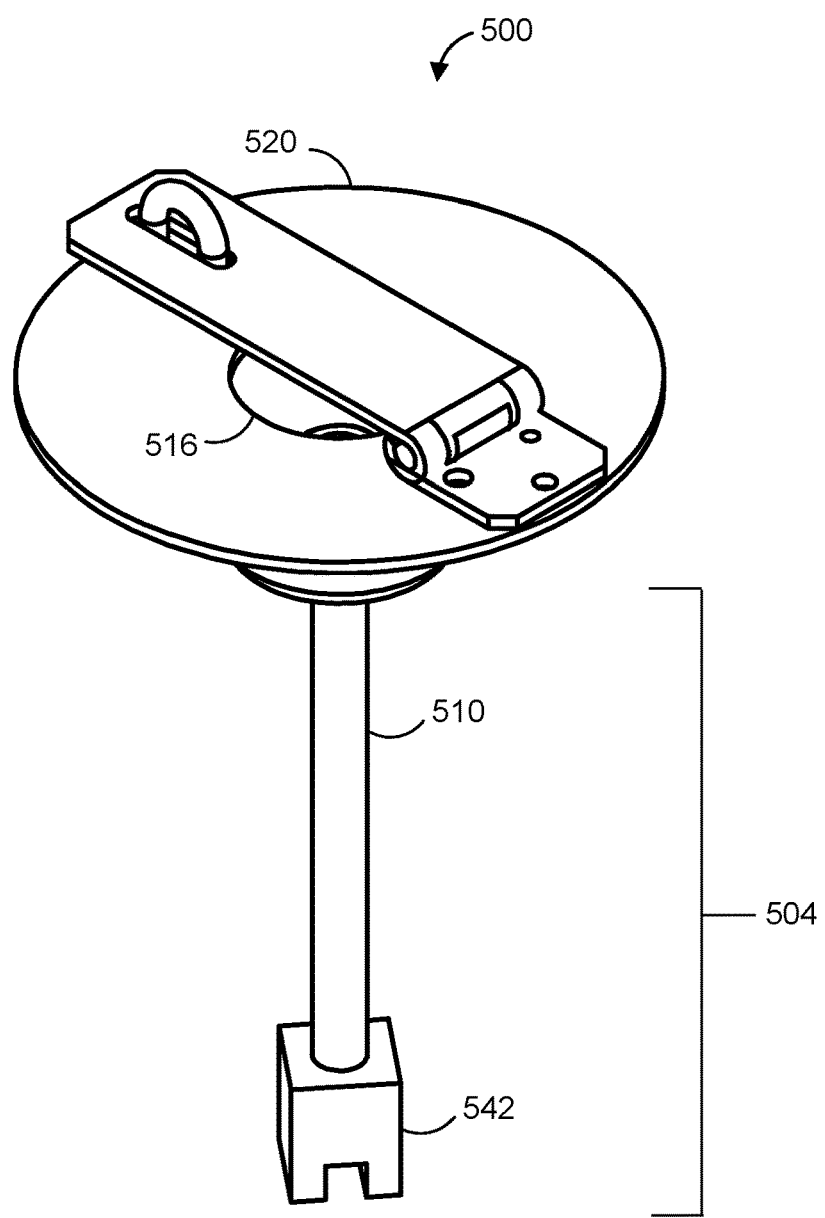
FIG. 5 illustrates a perspective view of an alternative embodiment of the invention utilizing a key-type drive member.

FIG. 5 illustrates a perspective view of an alternative embodiment of a securing member and a drive member assembly 500 usable with configurations of a lockout apparatus. As shown, the assembly 500 comprises a top plate 520 that is coupled on its bottom side to the top side of a recessed portion 516, such as through welding, epoxy, adhesive, glue or other means for coupling components. The recessed portion 516 is in the shape of a cylinder with its top side open and its bottom side having an aperture for receiving a drive member 504. In certain embodiments, the recessed portion 516 has a diameter of approximately two inches, and the aperture has a diameter of approximately three quarters of an inch.

As illustrated, the drive member 504 comprises a shaft 510 that is coupled on its lower end to a square key 542 configured to engage with an anchor member assembly. The illustrated square key 542 further comprises a keyway slot, such as a three-eighths inch slot, cut along the bottom portion of the key 542 for coupling to or engaging with the anchor member. In certain embodiments, the square key 542 is removable and/or interchangeable depending upon what type of anchor member is used.

The upper end of the shaft 510 extends through the aperture of the recessed portion 516 so that the drive member 504 can be accessed from the top side of the top plate 520. In certain embodiments, the shaft 510 further extends through one or more washers sitting within the recessed portion 516 to facilitate rotation of the drive member 504 and to prevent the drive member from passing through the aperture of the recessed portion 516.

Figure 6:
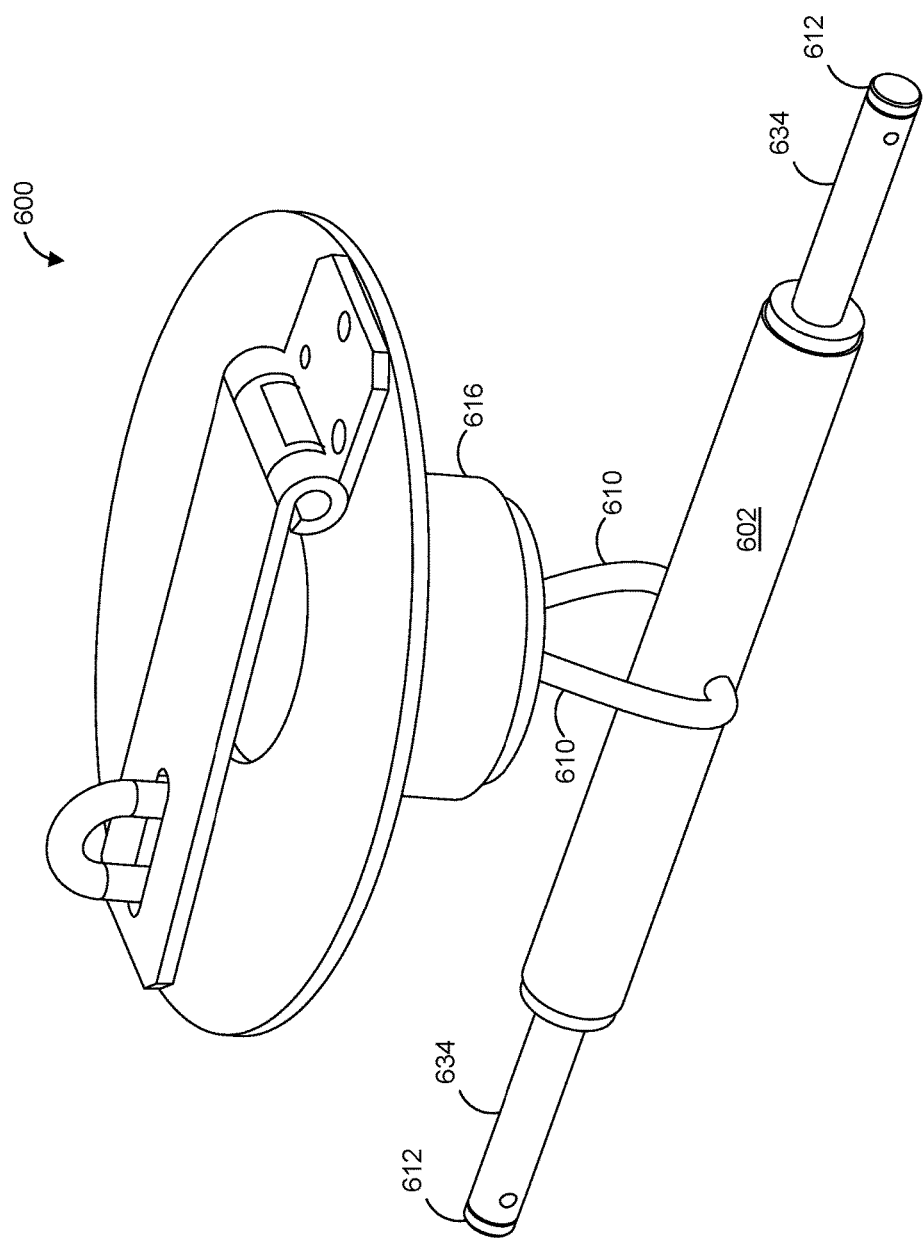
FIG. 6 illustrates a perspective view of a lockout apparatus having a pneumatic anchor member according to certain embodiments of the invention.

FIG. 6 illustrates a perspective view of a lockout apparatus 600 utilizing a pneumatic component according to certain embodiments of the invention. In particular, the apparatus 600 comprises a pneumatic piston 602 that anchors the apparatus 600 within a valve box. The piston 602 comprises double acting rods 634 configured to extend out from the piston 602 when activated by a pneumatic drive member, such as one comprising an American valve or a Schrader valve that sits within a recessed cavity 616. In certain embodiments, the drive member further comprises supply lines 610 that extend to one or more mounts of the piston 602 to activate each of the rods 634.

In certain embodiments, each of the rods 634 of the piston 602 has a stroke length between approximately one and four inches. Moreover, each end of the rods 634 can be fitted with a bumper 612 to provide for improved grip within a valve box.

In yet other embodiments, the drive member of the apparatus 600 can comprise a pump or similar device for activating or disengaging the piston 602. In yet other embodiments, the pneumatic anchor member can comprise an air cylinder, linear actuator, single-rod piston or other like device that utilizes air, introduced via a drive member extending through the securing member, to convert to linear movement of a rod, bore or like component.

Figure 7:
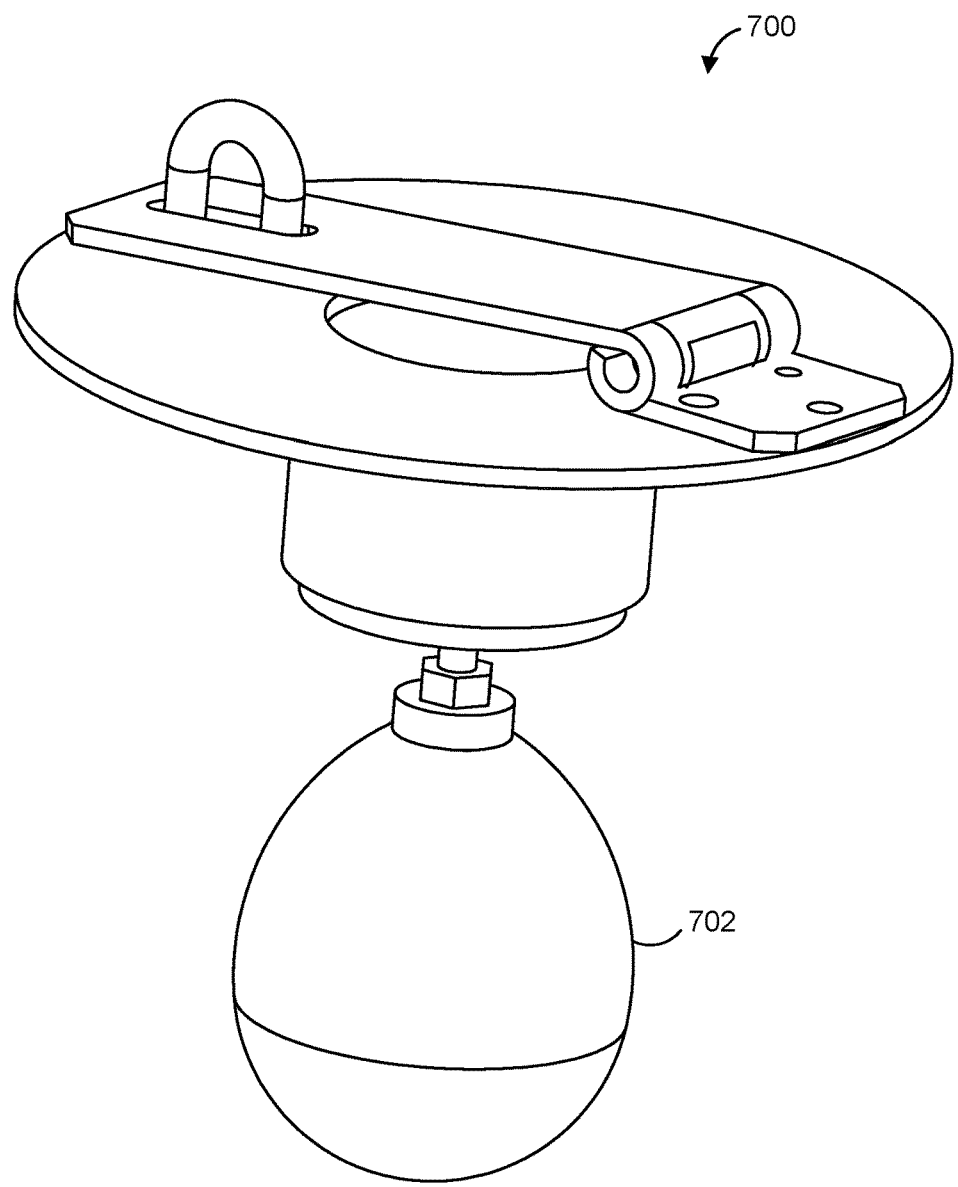
FIG. 7 illustrates a perspective view of another embodiment of a lockout apparatus having a pneumatic anchor member.

FIG. 7 illustrates a perspective view of another embodiment of a lockout apparatus having a pneumatic anchor member. In particular, the apparatus 700 comprises an inflatable anchor member 702 that can be expanded or contracted via a pneumatic valve, such as an American valve or a Schrader valve. In certain embodiments, the inflatable anchor member 702 can comprise a puncture resistant balloon made of a rubber or other flexible material.

Figure 8:
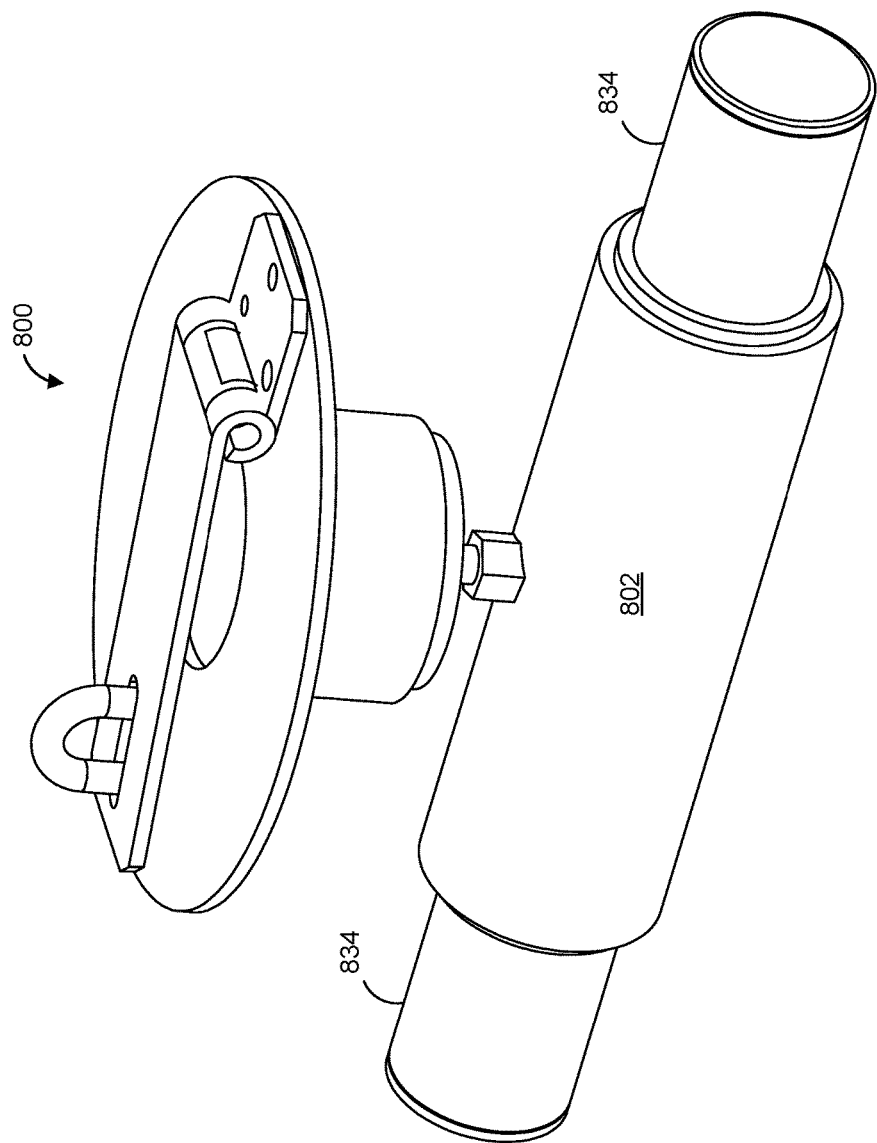
FIG. 8 illustrates a perspective view of a lockout apparatus having a hydraulic anchor member according to certain embodiments of the invention.

FIG. 8 illustrates a perspective view of a lockout apparatus having a hydraulic anchor member according to certain embodiments of the invention. In particular, the apparatus 800 includes a hydraulic cylinder 802 that anchors the apparatus 800 within a valve box via pistons 834. For instance, the cylinder 802 can comprise a non-differential cylinder or bottle jack device with pistons 834 that extend when a drive member is actuated by an operator. Moreover, each end of the pistons 834 can be fitted with a bumper, such as those described in previous drawings, to provide for improved grip within a valve box.

In certain embodiments, the hydraulic anchor member 802 can be controlled via a pump or other actuator. In yet other embodiments, the hydraulic anchor member can include a telescopic cylinder, a plunger cylinder, a differential cylinder, single-rod cylinder or the like.

Where the context permits, words in this disclosure using the singular or plural number may also include the plural or singular number respectively. The word "or" in reference to a list of two or more items, that word covers all of the following interpretations of the word: any of the items in the list, all of the items in the list, and any combination of the items in the list.

While certain embodiments of the inventions have been described, these embodiments have been presented by way of example only, and are not intended to limit the scope of the disclosure. Indeed, the novel devices, assemblies and methods described herein may be embodied in a variety of other forms; furthermore, various omissions, substitutions and changes in the form of the novel devices, assemblies and methods described herein may be made without departing from the spirit of the disclosure. The accompanying claims and their equivalents are intended to cover such forms or modifications as would fall within the scope and spirit of the disclosure.

What is claimed is:

1. A lockout apparatus for a valve box, the lockout apparatus comprising:
an anchor member comprising a scissor jack assembly having first and second bumpers secured to opposite sides of the scissor jack assembly;
a drive member comprising,
a head, and
an elongated shaft coupled to the head and operably connected to the scissor jack assembly, the elongated shaft configured to,
when the head is rotated in a first direction, cause a distance between the first and second bumpers to increase, and
when the head is rotated in a second direction, cause the distance between the first and second bumpers to decrease; and
a cover plate having a recessed portion, the recessed portion further comprising an aperture, wherein the head of the drive member is positioned within the recessed portion and the elongated shaft extends through the aperture of the recessed portion; and
a latch on a top side of the cover plate and configured to provide selective access to the head of the drive member such that when the latch is in an open position, the head of the drive member is uncovered, and when the latch is in a closed position, the head of the drive member is covered and cannot be rotated in either of the first or second directions, thereby preventing the distance between the first and second bumpers from substantially changing.

2. The lockout device of claim 1, wherein the scissor jack assembly further comprises lower and upper hubs, the first and second bumpers being positioned between the lower and upper hubs and within a plane substantially transverse to an axis running through the length of the elongated shaft.

3. The lockout apparatus of claim 2, wherein the elongated shaft comprises an elongated threaded shaft extending through the lower and upper hubs of the scissor jack assembly.

4. The lockout apparatus of claim 3, wherein the head of the drive member further comprises a hexagonal head.

5. The lockout apparatus of claim 1, wherein the elongated shaft is configured, when the head is rotated in the second direction, to cause the distance between the first and second bumpers to decrease to a minimum distance, wherein the minimum distance is approximately three inches.

6. The lockout apparatus of claim 5, wherein the elongated shaft is configured, when the head is rotated in the first direction, to cause the distance between the first and second bumpers to increase to a maximum distance, wherein the maximum distance is approximately six inches.

7. The lockout apparatus of claim 1, wherein the first and second bumpers comprise rubber pads.

8. The lockout apparatus of claim 1, wherein the cover plate has a diameter of more than six inches.

9. The lockout apparatus of claim 8, further comprising a loop on the top side of the cover plate, and wherein the latch further comprises a slot that is configured to engage with the loop when the latch is in the closed position.

10. A lockable device for a valve box, the lockable device comprising:
   a scissor jack having first and second bumpers secured to opposite sides of the scissor jack, the scissor jack adjustable between an expanded state and a contracted state, wherein in the expanded state the distance between the first and second bumpers is a first width, and wherein in the contracted state the distance between the first and second bumpers a second width, wherein the first width is shorter than the second width;
   a drive member operably connected to the scissor jack and configured to,
      when actuated in a first manner, adjust the scissor jack from the expanded state toward the contracted state, and
      when actuated in a second manner, adjust the scissor jack from the contracted state toward the expanded state; and
   a securing member comprising a plate having a diameter of at least six inches, wherein the drive member extends through the plate, and wherein the securing member is further configured to operate in an open or a closed position and to provide selective access to the drive member such that when the securing member is in the open position, the drive member is uncovered and accessible to be actuated in the first or second manners, and when the securing member is in the closed position, the securing member covers the drive member such that the drive member cannot be actuated in either the first manner or the second manner.

11. The lockable device of claim 10, wherein the drive member comprises a threaded shaft extending through the securing member and the scissor jack.

12. The lockable device of claim 10, wherein the second width is at least six inches.

13. The lockout apparatus of claim 9, further comprising a lock configured to extend through the loop to secure the latch in the closed position.

14. The lockable device of claim 10, wherein actuating the drive member in the first manner consists of rotation of the drive member in a first direction.

15. The lockable device of claim 10, wherein the first and second bumpers comprise rubber stops.

16. The lockable device of claim 10, further comprising a lock box assembly for locking the securing member in the closed position.

17. A lockable apparatus for blocking access to an actuator within a valve box, the lockable apparatus comprising:
   a scissor jack having first and second bumpers secured to opposite sides of the scissor jack;
   a cover plate;
   an elongated shaft operably connected to the scissor jack and extending through the cover plate, the elongated shaft configured to,
      when moved in a first direction, cause a distance between the first and second bumpers to increase, and
      when moved in a second direction, cause the distance between the first and second bumpers to decrease; and
   a latch on a top side of the cover plate and configured to operate in an open position and a closed position to provide selective access to the elongated shaft such that when the latch is in the open position, the elongated shaft is uncovered and accessible to be moved in the first or second directions, and when the latch is in the closed position, the latch covers the elongated shaft to prevent access to the elongated shaft.

18. The lockable apparatus of claim 17, wherein the second direction is opposite said first direction.

19. The lockable apparatus of claim 18, wherein the first and second directions comprise rotation of the elongated shaft.

20. The lockable apparatus of claim 17, wherein the cover plate comprises a metal cover plate.

\* \* \* \* \*